Feb. 2, 1965   E. J. BLIGARD ETAL   3,168,270
ENGINE MOUNT
Filed Feb. 11, 1963   3 Sheets-Sheet 1
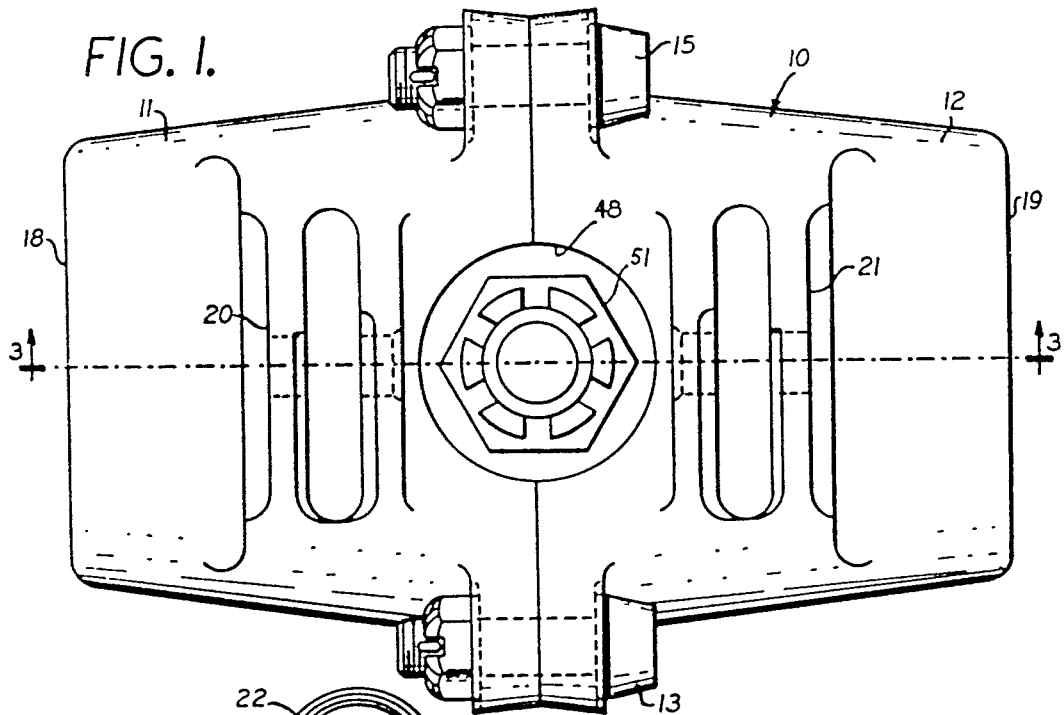
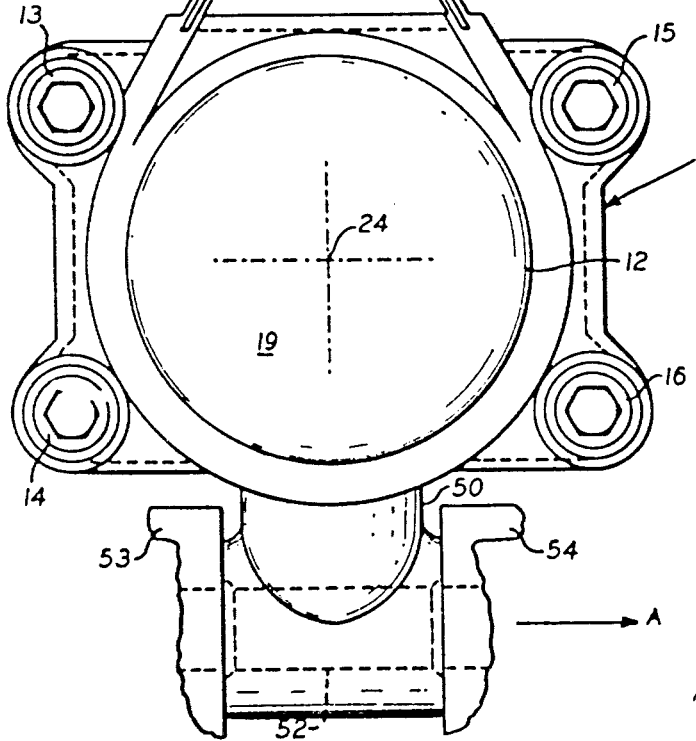
INVENTORS
ERLING J. BLIGARD
ROMOLO H. RACCA
BY
Byerly, Townsend, Watson & Churchill
ATTORNEYS.

INVENTORS
ERLING J. BLIGARD
ROMOLO H. RACCA
BY
Byerly, Townsend, Watson & Churchill
ATTORNEYS.

Feb. 2, 1965    E. J. BLIGARD ETAL    3,168,270
ENGINE MOUNT
Filed Feb. 11, 1963    3 Sheets-Sheet 3
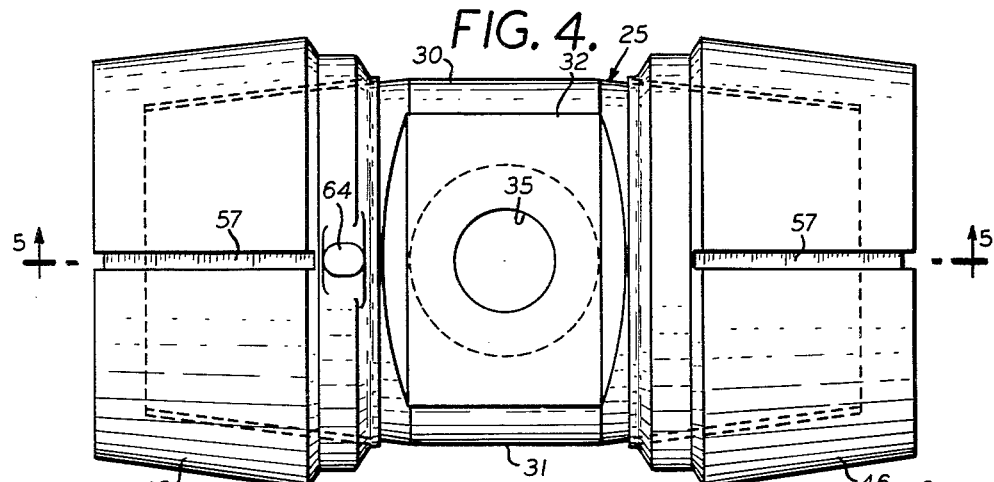
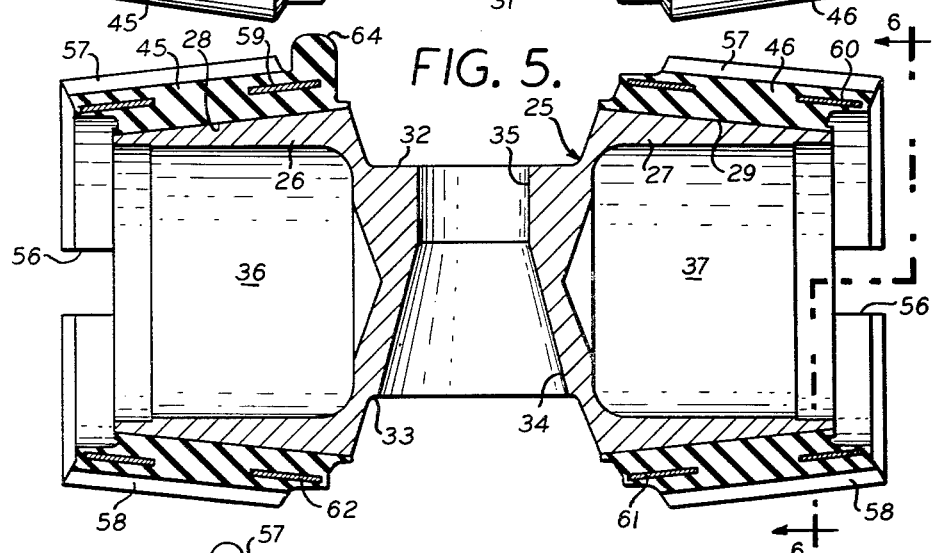
INVENTORS
ERLING J. BLIGARD
ROMOLO H. RACCA
BY
Byerly, Townsend, Watson & Churchill
ATTORNEYS.

United States Patent Office 3,168,270
Patented Feb. 2, 1965

3,168,270
ENGINE MOUNT
Erling J. Bligard, Northford, and Romolo H. Racca, Cheshire, Conn., assignors, by mesne assignments, to Cal-Val Research & Development Corp., Glendale, Calif., a corporation of Delaware
Filed Feb. 11, 1963, Ser. No. 257,480
14 Claims. (Cl. 248—5)

The present invention relates to engine mounts for aircraft engines.

Until recent years aircraft engines were commonly slung from a circular ring girdling the engine and carrying a plurality of mounts attached to the engine at spaced points around its circumference. Nacelles either in or under the wings, and the nose of the fuselage, were the conventional points of installation.

The jet age has produced virtually a revolution in aircraft design. No longer restricted by a propeller, the turbo-jet engines can be mounted wherever they can be supplied with adequate air intake and where the exhaust gases have an unimpeded path in the counterthrust direction. The foregoing has resulted in changes in engine mounting philosophy and has created a series of new problems with respect to the construction of the mounts.

When jet engines were first applied to aircraft it was felt that specific vibration isolation for passenger comfort was unnecessary since the turbine type engine operates at a much higher speed of rotation and is not subject to the many unbalances found in a reciprocating engine. Also, the major source of vibration in any aircraft had been the dynamic and aerodynamic imbalance of the propeller. So long as the turbo jet engines were mounted in pods hung under the wings, the limber rod and wing structure acted as a vibration isolator for the low level of engine unbalance. However, attempts are now being made to couple the engines close to the fuselage, e.g., at the rear. This gives rise to undesirable structurally borne vibration which requires isolation.

It has been found possible to support satisfactorily a turbo jet engine having a weight of, say, 4500 pounds by a three point mounting system either in a side mounted or overhead mounted mode. Two connections are made to the engine at circumferentially spaced locations in a transverse plane near the front of the engine and the third connection is made to the engine near its rear. The details of construction of the front mounts form the subject of a separate patent application filed contemporaneously herewith by the same joint inventors and will not be presented herein. It is only necessary to bear in mind that the front mounts described in the companion application are arranged to carry the entire thrust load of the engine. The present invention is directed to the construction of the rear mount which has a universal core assembly for use interchangeably in either the side mounted or overhead mounted position. As will be described hereinafter, the housings for the rear mount may differ slightly in order to accommodate such mounts to the available space in the aircraft.

According to the present invention there is provided an engine mount comprising a housing, pivot means on the housing for pivotally joining the housing to a supporting structure, a stem, link or bolt having one end for coupling to an engine and the other for entering the housing, the resilient coupling means being arranged to offer comparatively little resistance to rotation of the stem or the like about an axis parallel to the pivotal axis of the pivot means, while stiffly resisting all other movement of the stem or the like relative to the housing.

The invention will be better understood after reading the following detailed description of the presently preferred embodiments thereof with reference to the appended drawings in which:

FIGURE 1 is a top view of an engine mount embodying the present invention and intended for use in an overhead mounting system;

FIGURE 2 is a view of the right side of the mount of FIGURE 1 showing the manner in which it is connected to the engine;

FIGURE 4 is a plan view of the core assembly employed in the mount of FIGURE 1;

FIGURE 5 is a longitudinal sectional view taken along line 5—5 of FIGURE 4;

FIGURE 6 is an end elevational view partly in section taken along line 6—6 in FIGURE 5;

FIGURE 7 is a perspective view of one of the intermediate metal plates forming a part of the core assembly of FIGURE 4.

Figure 3:
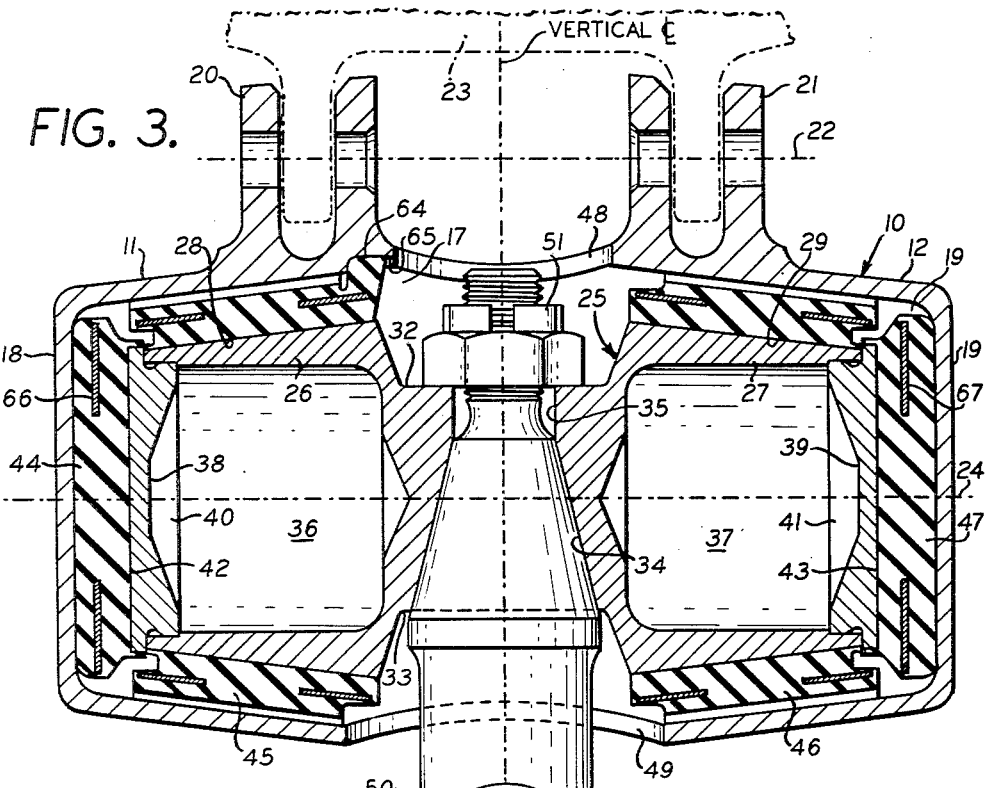
FIGURE 3 is a longitudinal sectional view of the engine mount taken along line 3—3 in FIGURE 1.

The engine mount about to be described is intended to function as the rear mount in a three point mounting system. In those systems where all of the mounts are confined to a common plane there exists no problem. However, where certain mounts are located at one end and others at the opposite end of an elongated engine, it is necessary to take into consideration the longitudinal expansion and contraction of the engine due to heating. This is the situation with the three point system under discussion.

It was mentioned above that the forward mounts are intended to take the thrust load; hence, the rear mount must accommodate thermal expansion. At the same time, the rear mount must afford a degree of vibration isolation which compares favorably with that obtainable from the forward mounts. The present invention meets and overcomes this problem most satisfactorily.

Reference should now be had to FIGURES 1 to 7 wherein the same reference numerals are used throughout to designate the same or similar parts. The engine mount includes a housing 10, formed in two halves 11 and 12 which are fastened together by bolt fasteners 13, 14, 15 and 16. The housing 10 has a generally cylindrical cavity 17 which tapers in both directions from its widest point at its center toward its ends 18 and 19 of lesser diameter. Pivot means in the form of the clevises 20 and 21 having a common clevis pin axis or pivotal axis 22 are formed on the exterior of the housing 10 for pivotally joining the housing to the airframe or supporting structure represented fragmentarily by the phantom outline 23. It will be observed that the pivotal axis 22 is parallel to the longitudinal axis 24 of the cavity 17. The ends 18 and 19 of the housing are flat and parallel, as shown.

A rigid core member 25 of generally cylindrical shape is disposed within the housing 10. The core member 25 has two end portions 26 and 27, each with external side walls 28 and 29 parallelly spaced from the walls of the tapered cavity 17. The midsection of the core member 25 has a reduced cross section which is cylindrical in the regions 30 and 31 but flattened at 32 and 33. A through bore having a conical section 34 and a cylindrical section 35 passes through the midsection. Both ends of the core member are lightened by the deep cavities 36 and 37. Finally, the cavities 36 and 37 are enclosed by removable end caps 38 and 39. The inner surfaces 40 and 41 of the end caps are relieved for weight reduction while the outer surfaces 42 and 43 are parallelly spaced from the end walls of the cavity in housing 10.

Elastomeric material 44, 45, 46 and 47 is sandwiched between the parallelly spaced walls and surfaces of the core member 25 and housing 10 maintaining the separation therebetween. By constructing the housing slightly undersize relative to the core assembly all of the elastomeric material is placed under slight compression. At the same time, it will be observed from a comparison of FIGURES 3 and 5, the frusto-conical sections of elastomeric material are skewed axially and strained in shear by reason of the cooperation with the tapered housing.

Openings 48 and 49 are provided in the housing 10 on opposite sides of the bore in the core member. These openings permit a cone bolt 50 to be inserted in the core member 25 and secured by the nut 51. For proper operation the cone bolt must be assembled to the core assembly in the orientation shown in the drawings. That is, the eye 52 of the cone bolt should be positioned such that its axis lies in a plane normal to the pivotal axis 22 of the housing.

When attached to an engine the vertical centerline of the mount as viewed in FIGURE 3 will coincide with the vertical centerline of the engine. A typical installation is suggested in FIGURE 2 where the eye of the cone bolt is located between parallel flanges 53 and 54. These flanges will form part of the engine housing whose longitudinal and thrust axis lies parallel to the axis of the eye 52 of the bolt. In FIGURE 2 the engine axis will also lie in the plane of the paper.

It should be apparent from a consideration of FIGURE 2 that any force or movement imparted to the cone bolt by the engine in a direction represented by the arrow A, will result in pure lateral translation of the cone bolt. This is due to the fact that the flange mounting of the eye 52 prevents the bolt 50 from rotating relative to the engine in the thrust direction. However, the housing 10 of the mount is free to rock or pivot relative to the airframe about the pivotal axis 22. Thus, movement of bolt 50 in the direction of arrow A, or in the opposite direction, is accompanied and resisted by rotation of the core member 25 about its longitudinal axis 24 relative to the housing 10. A brief consideration of FIGURE 3 will reveal that this action applies shearing stress to all of the elastomeric material but no compressive or tensile stress. The stiffness of the mount for this movement is relatively slight and can generally be ignored with respect to operation of the mount in the thrust direction.

However, forces applied to the cone bolt along the axes defined by the arrows B and C in FIGURE 3 result predominately in the production of compressive and tensile stresses in the elastomeric material.

A typical mount embodying the prevent invention was constructed and measured to determine its actual dynamic stiffness characteristics for the three axes above-mentioned at a temperature of 125° F. The results are tabulated below for the mount of FIGURES 1 to 3.

| Axis | Stiffness, (lbs./inch) |
| --- | --- |
| A | 2,000 |
| B | 265,000 |
| C | 74,000 |

These values were obtained using for the elastomeric material a butyl rubber composition having a durometer of approximately 50.

The core assembly which enabled the above characteristics to be obtained is shown in greater detail minus the end caps in FIGURES 4 to 7. It will be seen that the elastomeric material 45 and 46 is molded on the core member 25 so as to have a generally frusto-conical shape or configuration. Longitudinal grooves 55 and 56 of substantially full depth extend along both sides of the assembly while narrower and shallower grooves 57 and 58 extend along the top and bottom. These grooves, along with the intermediate frusto-conical plates 59, 60, 61 and 62 which are embedded in the elastomer, serve to modify the stiffness characteristics. FIGURE 7 shows the details of the intermediate plates 59, 60, 61 and 62 which are all alike. Apertures 63 are provided in the plate for equalizing the pressure on both sides of the plate during molding and for ensuring a firm anchorage.

A button or teat 64 is formed on the upper surface of the assembly for cooperation with the recess 65 in the housing (best seen in FIGURE 3) to ensure proper positioning of the core assembly within the housing when the housing halves are bolted together over the core.

Referring again to FIGURE 3, it will be seen that the end caps are each provided with an embedded intermediate annular metal ring or plate 66 and 67. These rings increase the stiffness of the end cap elastomer in known manner.

The mount described so far is completely satisfactory for overhead mounting. Where an engine is to be side mounted, increased strength and stability will be afforded by spacing the clevises further apart. Where space permits, the pivotal axis of the clevises may also be moved further away from the longitudinal axis of the mount. This latter change will reduce the stiffness in the A or thrust direction.

Figure 8:
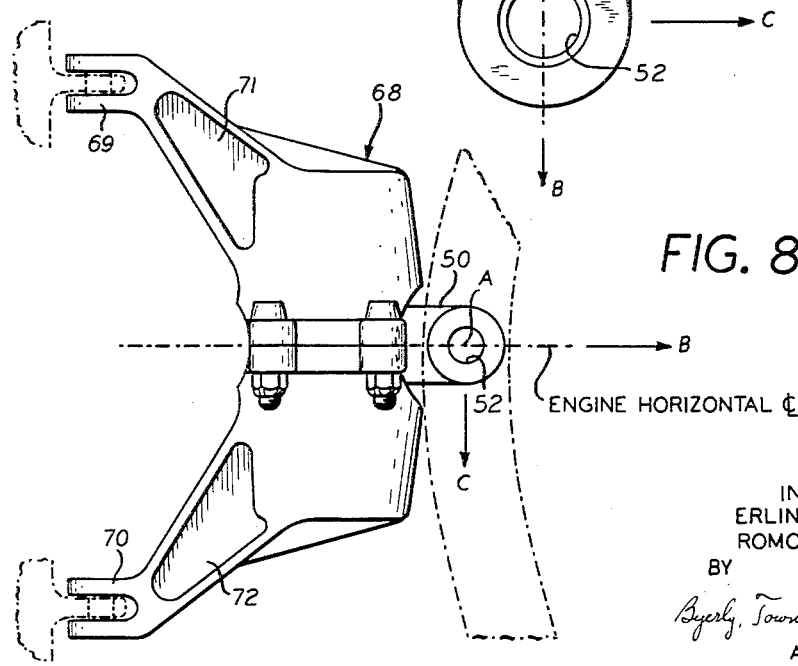
FIGURE 8 is a side elevational view of a modified mount embodying the invention and intended for use primarily in a side mounting system.

Both of the above mentioned modifications are incorporated in the mount shown in FIGURE 8. The mount has a housing 68 whose interior construction is identical to that of housing 10 described above. Externally, the clevises 69 and 70 are carried at the end of arms 71 and 72, as shown. The core assembly and cone bolt are identical to those already described and, where shown, carry the same reference numerals. Hence, the stiffnesses along both the B and C axes will be the same as that tabulated above. By way of example, the stiffness in the A direction may now be of the order of 1100 lbs./inch.

From the above it will be observed that the present invention provides a single core assembly which can be used interchangeably in both the overhead and side mounting mode. Naturally, the housing shown in FIGURE 8 may be used for overhead mounting too, when space is available. Where space is limited, the smaller housing envelope of FIGURE 1 is employed.

The invention has been described with reference to the presently preferred embodiments thereof. Those skilled in the art will understand that changes may be made in the specific details without departing from the true spirit of the invention as defined in the appended claims.

What is claimed is:

1. An engine mount comprising a housing, pivot means on said housing for pivotally joining the housing to a supporting structure, a rigid core element within the housing, elastomeric means sandwiched between said core element and the housing separating one from the other, said core element and said elastomeric means being arranged within the housing such that all of said elastomeric means is subjected to shearing stress when said core element is rotated relative to said housing about an axis passing through the core and parallel to the pivotal axis of said pivot means, and means for coupling said core element to an engine.

2. An engine mount according to claim 1, wherein said elastomeric means and said core element are constructed and arranged relative to said housing such that said elastomeric means is subjected predominantly to tensile and compressive stresses when said means for coupling the core element to an engine is subjected to forces acting in a plane passing through said pivotal axis of the pivot means.

3. An engine mount comprising a housing, pivot means on said housing for pivotally joining the housing to a supporting structure, a stem having one end for coupling to an engine and the other end for entering said housing, means for resiliently coupling said other end of the stem to the housing, said resilient coupling means being arranged to offer comparatively little resistance to rotation of said stem about an axis passing through the housing parallel to the pivotal axis of said pivot means, while stiffly resisting all other movement of said stem relative to said housing.

4. An engine mount comprising a housing, said housing having a generally cylindrical cavity which tapers in both direction from its widest point at its center toward its ends of lesser diameter, pivot means on the exterior of said housing for pivotally joining the housing to a supporting structure about a pivot axis which is parallel to the longitudinal axis of said cavity, a rigid core member within said housing having tapering external surfaces symmetrically spaced from and parallel to the tapered walls of said cavity, elastomeric material sandwiched between said tapering surfaces of the core member and said tapered walls of the housing maintaining the separation therebetween, and means for coupling the midsection of said core member to an engine.

5. An engine mount according to claim 4, wherein elastomeric pads are disposed between the end walls of the housing cavity and parallel spaced ends of said core member.

6. An engine mount according to claim 4, wherein said means for coupling said core member to an engine comprises a bolt which removably attaches to said core member and has an eye for coupling to the engine.

7. An engine mount comprising a housing, said housing having a generally cylindrical cavity which tapers in both directions from its widest point at its center toward its ends of lesser diameter, pivot means on the exterior of said housing for pivotally joining the housing to a supporting structure about a pivot axis which is parallel to the longitudinal axis of said cavity, a rigid core member of generally cylindrical shape within said housing, said core member having (a) end portions with external side walls parallelly spaced, from the walls of said tapered cavity,
(b) a midsection of reduced cross-section,
(c) a through bore passing through said midsection,
(d) cavities in both ends, and
(e) removable end caps closing said cavities in the ends, said end caps having outer surfaces parallelly spaced from the end walls of the cavity in said housing, elastomeric material sandwiched between the parallelly spaced walls and surfaces of said core member and said housing maintaining the separation therebetween, said material being in a state of slight compression, openings in said housing opposite said through bore, and means securable in said bore for coupling said core member to an engine.

8. An engine mount according to claim 7, wherein the elastomeric material sandwiched between the tapered parallelly spaced walls and surfaces is generally frusto-conical in shape and is provided with longitudinal grooves for tailoring the stiffness characteristics of the mount.

9. An engine mount according to claim 8, wherein the frusto-conical elements of elastomeric material have intermediate frusto-conical plates embedded therein.

10. An engine mount according to claim 9, wherein the elastomeric material in contact with each end cap is provided with an intermediate annular plate embedded therein.

11. A core assembly for an engine mount comprising a rigid core member of generally cylindrical shape, said core member having (a) end portions with external side walls tapering from the widest point near its center toward its ends of lesser diameter,
(b) a midsection of reduced cross-section,
(c) a through bore passing through said midsection,
(d) cavities in both ends, and
(e) removable end caps closing said cavities, said end caps having outer parallel planar surfaces, generally frusto-conical elements, of elastomeric material surrounding and secured to said tapering side walls of the core member, and pads of elastomeric material secured to said outer surfaces of the end caps.

12. A core assembly according to claim 11, wherein the frusto-conical elements of elastomeric material have intermediate frusto-conical plates embedded therein and are provided with longitudinal grooves for tailoring the stiffness characteristics of the assembly.

13. A core assembly according to claim 12, wherein said pads are each provided with an intermediate annular plate embedded therein.

14. An engine mount comprising a housing, pivot means on said housing for pivotally joining the housing to a supporting structure, a stem having one end provided with an eye for pivotal connection to an engine and the other end for entering said housing, means for resiliently coupling said other end of the stem to the housing, said resilient coupling means being arranged to offer comparatively little resistance to rotation of said stem about an axis passing through the housing parallel to the pivotal axis of said pivot means, while stiffly resisting all other movement of said stem relative to said housing.

References Cited by the Examiner
UNITED STATES PATENTS 2,385,759  9/45  Henshaw _____ 248—5
2,761,638  9/56  Getline _____ 248—5

CLAUDE A. LE ROY, *Primary Examiner.*